(No Model.)
G. A. BARTON.
WHEEL.
No. 369,579. Patented Sept. 6, 1887.
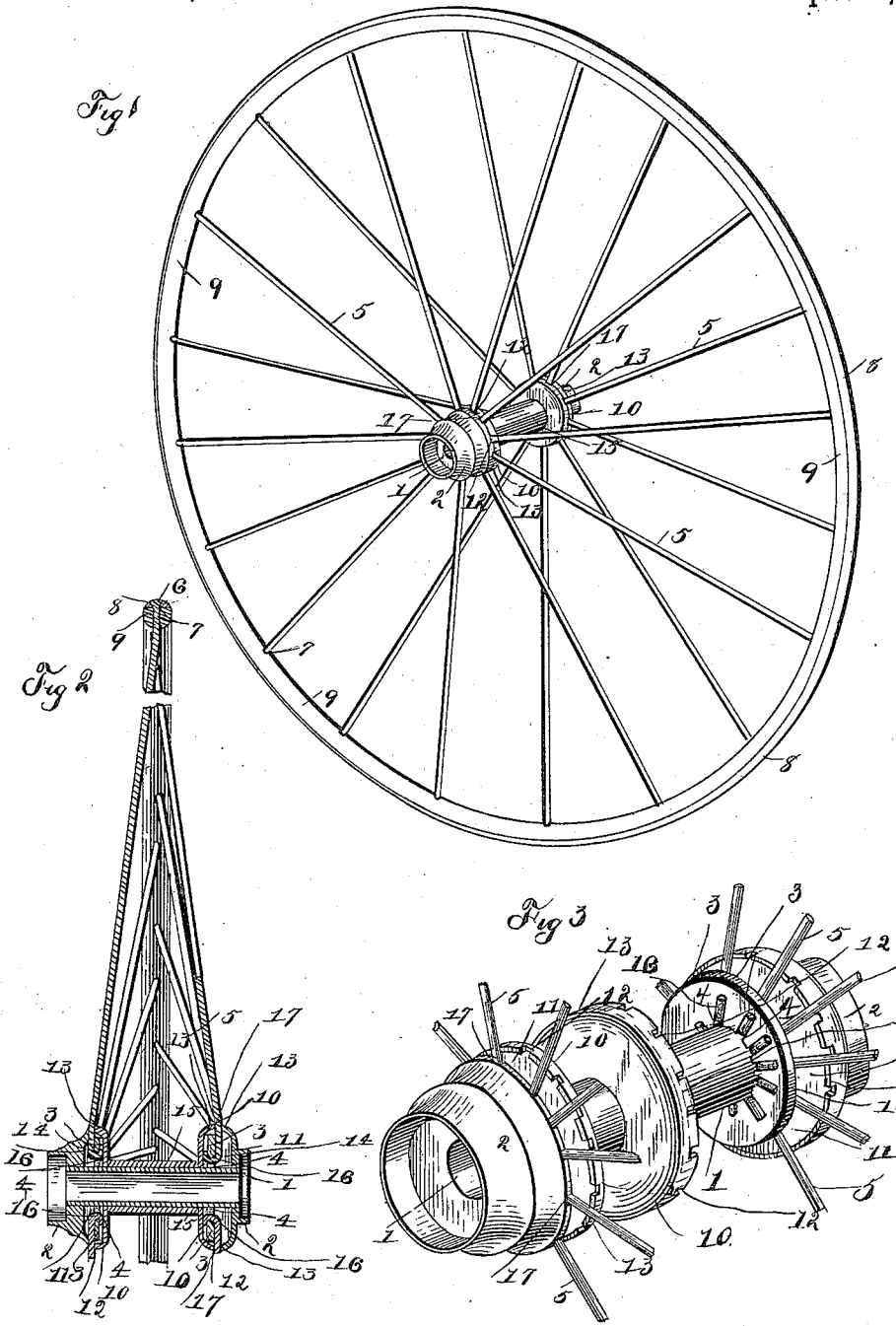

UNITED STATES PATENT OFFICE.

GEORGE A. BARTON, OF WALTON, NEW YORK.

WHEEL.

SPECIFICATION forming part of Letters Patent No. 369,579, dated September 6, 1887.

Application filed May 24, 1887. Serial No. 239,208. (No model.)

*To all whom it may concern:*

Be it known that I, GEORGE A. BARTON, a citizen of the United States, and a resident of Walton, in the county of Delaware and State of New York, have invented certain new and useful Improvements in Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved vehicle-wheel. Fig. 2 is an axial sectional view of the same; and Fig. 3 is a perspective view of the hub and spokes, showing the spokes as being secured before the spreading-sleeve is put in position or the caps drawn together.

Similar numerals of reference indicate corresponding parts in all the figures.

My invention has relation to vehicle-wheels partly or entirely made of metal and having the spokes formed by wires; and it consists in the improved construction and combination of parts of such a wheel, as hereinafter more fully described and claimed.

In the accompanying drawings, the numeral 1 indicates the box or sleeve of the wheel, to the ends of which two caps, 2, forming the ends of the hub, are secured. Two washers, 3, are slipped upon the ends of the box, with their central perforations, and a number of notches, 4, are formed in the edges of the perforations of these washers.

The spokes 5 are formed by pieces of wire having their outer enlarged ends, 6, secured in perforations 7 in the metallic tire 8 and passed through the rim or felly 9, and the inner ends of these spokes are drawn into the notches in the washers and bent inward upon the faces of the same.

Two inner caps, 10, are placed upon the box inside of the washers, and have recesses 11 in their outer faces, in which the washers may rest, and have notches 12 in the flanged edges 13, through which the spokes may project, the notches in the flanges registering with the notches in the washers.

The outer caps have recesses 14 in their inner faces and notches 17 in the flanges, and the washers may thus be inclosed in the recessed faces of the caps having the spokes projecting out through the notches in the flanges of the caps.

A sleeve, 15, is placed upon the box between the inner caps, spreading the caps and washers, and thus tightening the spokes, whereupon the outer caps may be secured upon the box.

It will be seen that in drawing the spokes in the notches of the washers and bending their inner ends they may all be drawn and tightened evenly before the ends are cut off after the hooks have been formed, the said hooks being numbered 16 in the drawings, and after all the spokes have been drawn and cut off evenly the washers and caps are spread perfectly even by the interposed sleeve, so that the strain of the spokes upon the rim and tire, and consequently, also, the strain caused by weight upon the hub through the axle of the vehicle, will be evenly distributed over the entire rim and tire.

I prefer to have the rim made from wood and provided with a metallic tire, as the wooden rim will thus deaden the rattle and noise of the metallic tire, although the rim and tire may be of any other suitable material; but of course I do not make any claim for the wooden rim and metallic tire, as that construction can be found in almost any vehicle-wheel.

Having thus described my invention, I claim and desire to secure by Letters Patent of the United States—

In a vehicle-wheel, the combination of a box or sleeve, washers upon the ends of the box formed with notches in the edges of the perforations, wire spokes secured at the outer ends and having their inner ends drawn through the notches and hooked in the same, inner caps having recessed faces formed with notches in the flanges registering with the notches in the washers receiving the spokes, outer caps upon the ends of the box inclosing the washers between their recessed inner faces and the recessed faces of the inner caps and having notches for the spokes, and a sleeve upon the box serving to spread the caps and the washers, as and for the purpose shown and set forth.

In testimony that I claim the foregoing as my own I have hereunto affixed my signature in presence of two witnesses.

GEORGE A. BARTON.

Witnesses:
GEORGE O. MEAD,
GEORGE S. FITCH.